June 3, 1930. F. FELDMAN 1,761,112

TOWING CABLE

Filed July 20, 1929

FRANK FELDMAN
INVENTOR

PER Minnin & Pike

ATTORNEYS

Patented June 3, 1930

1,761,112

UNITED STATES PATENT OFFICE

FRANK FELDMAN, OF RANDSBURG, CALIFORNIA

TOWING CABLE

Application filed July 20, 1929. Serial No. 379,831.

This invention relates to improvements in towing cables, and has for one of its principal objects the provision of a towing cable for automobiles or the like which can be made rigid for operating purposes and which at the same time is capable of being rendered collapsible for storage and transportation purposes.

One of the important objects of this invention is to provide a towing cable for automobiles or the like which will eliminate the danger of the towed car colliding with the towing car in the event of a sudden stop, and which at the same time will provide the resilient features so convenient and desirable in towing cables.

Still another and further important object of this invention is to provide in a towing cable for automobiles or the like an element which can be readily converted from a flexible, collapsible, easily-stored device to a rigid shaft for convenient towing purposes.

Other and further important objects of the invention will be apparent from the disclosures in the accompanying drawings and following specification.

The invention, in a preferred form, is illustrated in the drawings and hereinafter more fully described.

Figure 1:
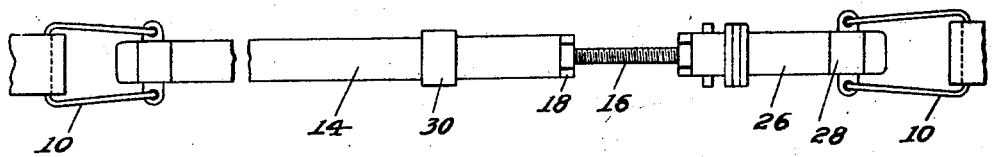
Figure 1 is a plan view of the improved towing cable of this invention showing the same in operative position.

The reference numerals 10 indicate generally the operating ends of the cable, or in other words the elements by which it is attached to cars for towing purposes and the like. Obviously, these may be of any desired form or construction.

These elements 10 are attached to each other by means of a flexible cable 12, and slidably positioned upon the cable is a series of metal sleeves or the like 14 which are adapted to abut each other, and to tighten into position on the cable, thereby forming a practically stiff rod.

This is accomplished by having mounted on the cable a section of tubing 16 which is exteriorly screw-threaded and has at one end a fixed nut or the like 18.

Adapted to be turned upon the screw-threaded tube 16 is a lock nut 20 which in turn co-operates with an operating nut 22 having suitable operating lugs 24 extending therefrom by means of which the same can be readily turned. This in turn is associated by means of washers and the like with a further section of tubing 26 which when the nuts 20 and 22 are turned rearwardly on the shaft 16 will abut against the cable holding casing 28 of the yoke 10, thereby forming a rigid non-flexible tow bar.

Figure 4:
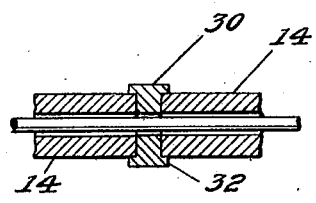
Figure 4 shows in detail a reinforcing element.
Figure 2:
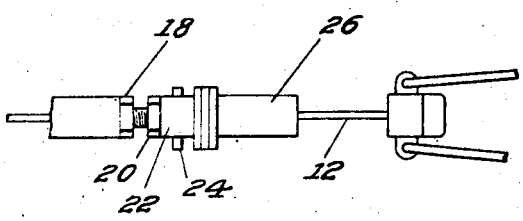
Figure 2 is an end view showing the same in flexible condition.
Figure 3:
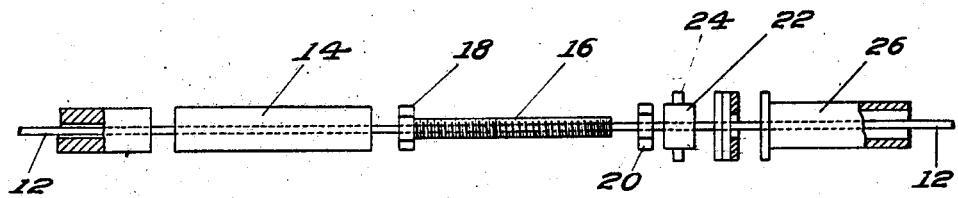
Figure 3 is a detail view illustrating the parts for assembly.

A reinforcement for helping to maintain the tubing sections 14 in stiff relation with each other is provided in the way of an open-ended cylinder 30 having an annular shoulder 32 at each end into which the ends of the tubing sections 14 are adapted to be fitted. This is best shown in Figure 4.

Figure 6:
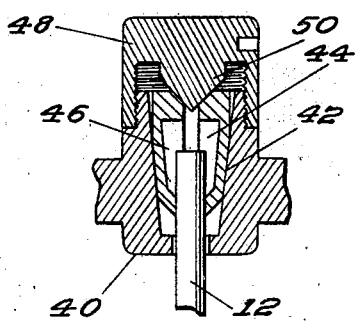
Figure 6 illustrates a preferred form of mounting for the ends of the cable.
Figure 5:
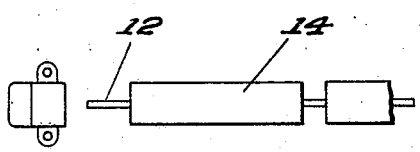
Figure 5 shows the end of the cable opposite the end illustrated in Figure 2.

The ends of the cable may be tightened to the end units in any suitable or convenient manner preferably as best shown in Figure 6 wherein each unit element 40 is hollowed to receive the end of the cable 12, this hollow portion being made wedge-shaped as illustrated at 42 and into which is adapted to be fitted a cable gripping element formed in two sections 44 and 46 which are forced together so as to permanently grip the cable upon the turning down of a screw threaded cap 48 adapted to be applied to the end unit 40 and which cap is provided with an interior conical element 50 which acts to spread the members 44 and 46 at their upper ends while at the same time they are forced downwardly, and their lower ends inwardly into gripping relation with the end of the cable 12.

It will be evident that herein is provided an all-metal collapsible automobile tow line or tow bar which can be readily and conveniently carried in a collapsed inoperative position while at the same time may be just as readily and conveniently brought into operation, and which will provide a much more satisfactory means of towing cars than the ordinary flexible cable.

I am aware that many changes may be made, and numerous details of construction varied throughout a wide range without departing from the spirit of this invention, and I therefore do not purpose limiting the patent granted hereon otherwise than as necessitated by the prior art.

I claim as my invention:

1. An automobile tow line including a cable, yokes on the ends of the cable, and means for rendering the cable rigid for operating purposes, said means including a plurality of sections of tubing on the cable and means for forcing the ends of the said tubing sections together, said means comprising a screw-threaded longitudinal adjustment between certain of the sections, said adjustments comprising an exteriorly screw-threaded tubing section and adjusting nuts on said section, together with reinforcing elements positioned between certain of said tubing sections.

2. An automobile tow line including a cable, yokes on the ends of the cable, and means for rendering the cable rigid for operating purposes, said means including a plurality of sections of tubing on the cable and means for forcing the ends of the said tubing sections together, said means comprising a screw-threaded longitudinal adjustment between certain of the sections, said adjustments comprising an exteriorly screw-threaded tubing section and adjusting nuts on said section, said adjusting nuts abutting a further section slidable on the screw-threaded section.

3. An automobile tow line including a cable, yokes on the ends of the cable, and means for rendering the cable rigid for operating purposes, said means including a plurality of sections of tubing on the cable and means for forcing the ends of the said tubing sections together, said means comprising a screw-threaded longitudinal adjustment between certain of the sections, together with reinforcing elements positioned between certain of said tubing sections.

4. An automobile tow line including a cable, yokes on the ends of the cable, and means for rendering the cable rigid for operating purposes, said means including a plurality of sections of tubing on the cable and means for forcing the ends of the said tubing sections together, said means comprising a screw-threaded longitudinal adjustment between certain of the sections, together with reinforcing elements positioned between certain of said tubing sections, said reinforcing elements comprising open-ended cylinders of a diameter slightly greater than the tubing sections, each end of the cylinder provided with an annular lip for the reception of the end of a tubing section.

5. An automobile tow line including a cable, yokes on the ends of the cable, and means for rendering the cable rigid for operating purposes, said means including a plurality of sections of tubing on the cable and means for forcing the ends of the said tubing sections together, and means for fastening the ends of the cable in the yoke elements, said means comprising wedge-operated gripping elements, together with rotatable screw caps on the end elements for operating the said wedges.

In testimony whereof I affix my signature.

FRANK FELDMAN.